April 14, 1925.  W. J. NEIDHART  1,533,132
GARDEN TOOL
Filed July 14, 1924
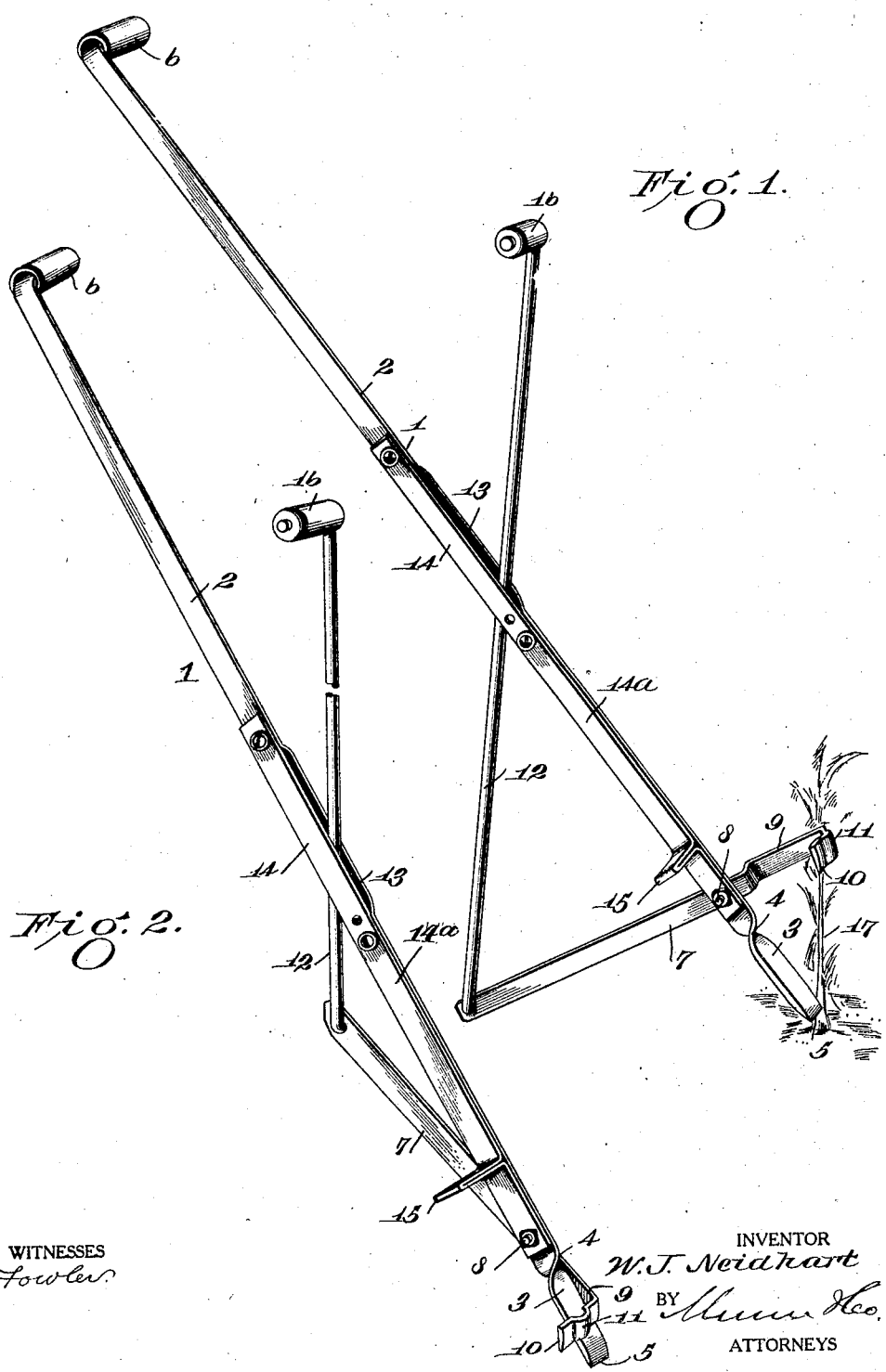

Patented Apr. 14, 1925.

1,533,132

UNITED STATES PATENT OFFICE.

WILLIAM JOHN NEIDHART, OF SOUTH BEND, INDIANA.

GARDEN TOOL.

Application filed July 14, 1924. Serial No. 725,905.

*To all whom it may concern:*

Be it known that I, WILLIAM J. NEIDHART, a citizen of the United States, residing at South Bend, in the county of Saint Joseph, State of Indiana, have invented certain new and useful Improvements in Garden Tools, of which the following is a specification.

My invention relates to improvements in garden tools, more particularly to a garden tool adapted for use in removing weeds, and it consists in the combinations, constructions and arrangements herein described and claimed.

An object of the invention is to provide a simple and reliable tool of the character described which is adapted to be manipulated conveniently and easily to effect removal of weeds without there being any necessity of the user of the tool stooping over or grasping the weeds during the removal thereof.

A further object of the invention is to provide a tool of the character described which affords facilities for cutting the roots of the weeds and for gripping the stem portions of the weeds so that the stems and the main roots of weeds may be removed through the use of the tool.

A still further object of the invention is to provide a tool of the character described which comprises but relatively few parts, is not likely to get out of order easily and is thoroughly practical commercially.

Other objects and advantages will be apparent from the following description, considered in conjunction with the accompanying drawings, in which:—

Figure 1 is a perspective view of the tool, showing the pivoted jaw member thereof in raised or non-gripping position, Figure 2 is a view similar to Figure 1 showing the jaws of the tool closed.

A tool embodying the invention comprises an elongated body or staff indicated generally at 1 which comprises a bar 2 having an end portion 3 twisted at 4 from the plane of the body substantially at right angles thereto, the end portion 3 being provided at its extremity with a sharpened edge 5 and constituting both a cutting blade and a fixed jaw member. The bar 2 is bent laterally at its opposite end and the laterally bent portion is provided with a grip member 6. A jaw member for co-operating with the jaw member 3 is formed of a bar 7 which is attached by a horizontal pivot element 8 to the bar 2 intermediate the length of the bar 7 and at a point slightly above the twisted portion 4 of the bar 2. The bar 7 has an end portion thereof offset laterally at 9, the extremity of such end portion being bent laterally across the plane of the major portion of the jaw 7 as indicated at 10 to provide a clamping jaw which will be swung into contact with the upper face of the jaw 3 when the jaw member 7 is swung in one direction about the axis of the pivot element 8. The jaw 10 may be curved longitudinally along the arc of a circle intermediate its length as indicated at 11 to partially encircle a circular object, such as a stem of a weed.

The end of the bar 7 opposite to that which is formed to provide the jaw 10 is provided with an aperture for the reception of the laterally turned end of an operating rod 12 which extends slidably through a guide loop 13. The guide loop 13 is provided intermediate the length of the body 1 by offsetting the intermediate portion of the bar 2 laterally of the plane of the major portion of the bar 2 and then securing a cover bar 14 to the bar 2 in position to cover the space within the offset intermediate portion of the bar 2. The cover bar 14 is extended downwardly along the bar 2, as indicated at 14ª and bent outwardly and then back upon itself against the bar 2, at 15, to provide a foot piece. The extension 14ª is secured to the bar 2 below the foot piece 15 by suitable fastening means which in the embodiment of the invention illustrated in the drawings is the pivot element 8.

The operating rod 12 is provided at its upper end with a laterally turned grip member 16.

From the foregoing description of the various parts of the device, the operation thereof will be readily understood. The user of the device stands erect and places the cutting edge of the blade 3 in position to enter the ground at the base of a weed such, as indicated at 17, and to cut the branching roots of the weed. Pressure of the foot on the foot piece 15 will cause the blade to enter the ground and to cut the roots of the weed. At this time, the handle 16 is grasped and the rod 12 is actuated to swing the pivoted jaw member 7 from the position illustrated in Figure 1 to the position illustrated in Figure 2 so that the clamping jaw 10 will swing downwardly. The stem of the weed will be gripped at its base between the blade 3 which serves as a jaw and the clamping jaw 10. It will be manifest that a slight upward pull on the handles 6 and 16 will cause the weed to be pulled from the ground.

The device is simple in construction, can be manipulated conveniently and easily without any appreciable muscular strain, and is not likely to get out of order easily.

I claim:

A tool of the character described comprising an elongated body formed of a bar having an end portion thereof twisted to lie in a plane extending at right angles to the plane of the major portion of the bar, said end portion being sharpened at its extremity to provide a cutting edge, said bar being bent laterally at its other end, a grip member carried by said laterally turned end portion, a second bar pivotally attached intermediate its length to the first bar at a slight distance above the upper end of said first-named end portion of the first bar, said second-named bar having an end portion thereof to provide a jaw for co-operating with the first-named end portion of the first bar, an operating handle pivotally attached at one end to the second end of the first-named bar, said first-named bar being offset laterally intermediate its length for the reception of said operating handle, a cover bar secured to said first-named bar in position to retain said operating handle between itself and said offset portion of the first-named bar and to permit movement of said operating handle in a vertical plane, said cover bar having an extension secured to the first-named bar and provided with a laterally turned portion constituting a foot piece.

WILLIAM JOHN NEIDHART.